United States Patent Office 3,491,101
Patented Jan. 20, 1970

---

3,491,101
5,8-DIOXYGENATED ISOQUINOLINE-4-CARBOXYLATES
George Rodger Allen, Jr., Old Tappan, and Martin Joseph Weiss, Oradell, N.J., assignors to American Cyanamid Company, Stamford, Conn., a corporation of Maine
No Drawing. Filed May 19, 1967, Ser. No. 639,632
Int. Cl. C07d *35/30, 35/14, 99/04*
U.S. Cl. 260—287                                   10 Claims

ABSTRACT OF THE DISCLOSURE

Novel 5,8-dioxygenated isoquinolines substituted at the 1,3 and 4-positions and processes for their preparation. The compounds are useful for their anti-inflammatory, anti-pyretic and analgesic properties.

---

Summary of the invention

This invention relates to isoquinoline derivatives which can be illustrated by the following formula:

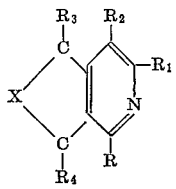

wherein R is selected from the group consisting of hydroxy and lower alkyl, $R_1$ is lower alkyl; $R_2$ is carbolower alkoxy; $R_3$ is selected from the group consisting of hydroxy, oxygen, lower alkoxy and lower alkanoyloxy; $R_4$ is selected from the group consisting of hydroxy, oxygen, lower alkoxy and lower alkanoyloxy; X is selected from the group consisting of

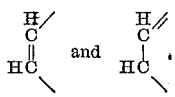

$R_2$ and $R_3$ taken together is $$O-C=O$$

and when $R_3$ and $R_4$ are oxygen, then

The lower alkyl and lower alkanoyl group contains from 1 to 6 carbon atoms.

The novel isoquinoline derivatives of the present invention are, in general, crystalline solids having characteristic melting points and absorption spectra. They are substantially insoluble in water and petroleum ether but are relatively soluble in acetone, ethyl acetate, methanol, ethanol, and the like.

The novel compounds of the present invention are capable of forming pharmaceutically acceptable acid-addition salts with a variety of acids. Such salts may be readily prepared by the simple addition of acid to the isoquinoline in an inert organic solvent such as, for example, methanol or ether and include those prepared from acids, such as, hydrochloric, hydrobromic, hydriodic, sulfuric, phosphoric, and the like. For purposes of this invention, the free bases are equivalent to their non-toxic pharmaceutically acceptable acid-addition salts.

The novel 1,3-dilower alkyl-5,8-oxygenated isoquinolines of the present invention may be prepared as shown in the following flowsheet.

FLOW SHEET

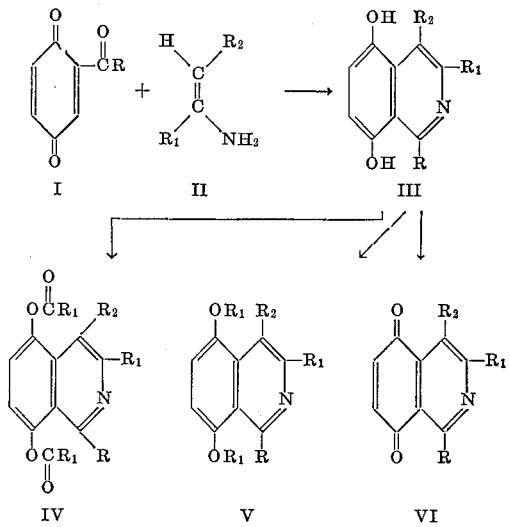

wherein R, $R_1$ and $R_2$ are as defined hereinbefore.

Thus, in accordance with the above flowsheet, the isoquinoline ring system is generated by the reaction of an alkyl 3-aminocrotonate (II) with a 2-acyl-1,4-benzoquinone (I). Both of the starting compounds are well-known and may be prepared without difficulty by methods described in the literature. The reaction may be effected at about 25° to 140° C., and the utilization of an inert solvent as a reaction medium is beneficial. Suitable solvents may be, for example, acetone, methanol, ethanol, chloroform, methylene chloride, benzene, toluene, xylene, tetrahydrofuran, dioxane, and the like. The preferred solvent here is chloroform. The resulting 5,8-dihydroxyisoquinoline (III) provides for the preparation of other novel compounds of this invention. On treatment with a lower alkanoic acid anhydride and alkali metal salt of a lower alkanoic acid, the 5,8-lower alkanoyloxy isoquinoline (IV) results. Treatment of (III) with a lower alkyl sulfate or lower alkyl halide in the presence of an alkali metal hydroxide or carbonate gives the 5,8-lower alkoxy isoquinoline (V). Oxidation of the 5,8-dihydroxyisoquinolines (III) furnishes the isoquinoline-5,8-diones (VI).

The 1,5,8-trioxygenated isoquinolines of the present invention may be prepared as shown in the following flowsheet:

FLOW SHEET

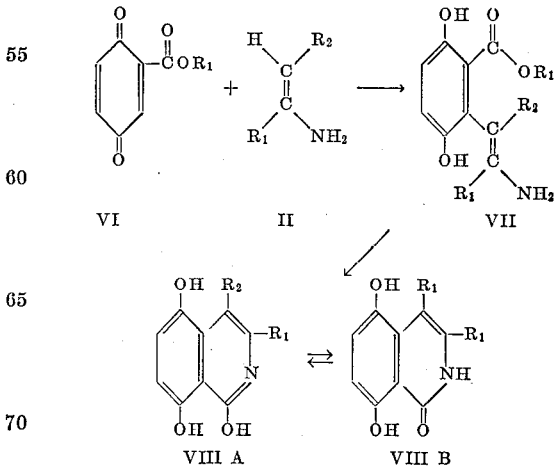

wherein $R_1$ and $R_2$ are defined as described hereinbefore.

In accordance with this flowsheet, reaction of an alkyl 3-aminocrotonate (II) with a 2-lower alkoxycarbonyl-1,4-benzoquinone (VI) produces the hydroquinoid adduct (VII), which on treatment with an alkanoic acid at 25–100° C. produces the 1,5,8-trioxygenated isoquinoline (VIII). It is to be understood that the novel compound (VIII) of the present invention may theoretically exist in either tautomeric form as shown in (VIII A) or (VIII B). These various tautomeric forms are also included within the scope of the present invention.

The novel isoquinoline-5,8-lactones (X) of the present invention may be prepared by pyrolysis of the t-butyl isoquinoline-4-carboxylates (IX) as shown in the reaction below.

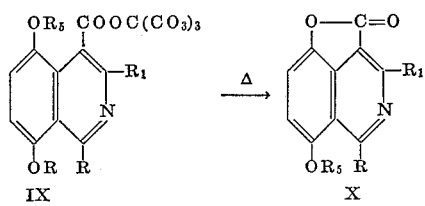

wherein R and $R_1$ are as defined hereinbefore and $R_5$ is a member of the group consisting of hydrogen and lower alkanoyl.

The novel compounds of the present invention are active anti-inflammatory, anti-pyretic agents and analgesics at non-lethal doses. A test useful in detecting anti-inflammatory activity is a modification of the method reported by C. A. Winter et al., Proc. Soc. Exptl. Biol. Med., 111, 544 (1962). This test involves the reduction of the edema caused by the injection of a 2% carrageenin solution. Briefly, the test is as follows: Groups of the two rats each are injected subcutaneously at the midline of the shaved sacral region with 0.5 ml. of an aqueous 2% carrageenin solution. Carrageenin is a polygalactose sulfate extracted from Irish moss, a type of seaweed. Subcutaneous injection of carragreenin causes rapid formation of an intense subcutaneous inflammatory reaction which develops into a connective tissue granuloma. The test compounds of this invention are suspended in aqueous 1% starch-sodium phosphate buffer solution, pH 6.5, and administered by oral tubing in 0.5 ml. of said buffer; the total dose for each animal is 250 mg./kg. of body weight. One-half of each total dose is administered immediately following the carrageenin injection and the other half of each total dose is administered all at once immediately following the carrageenin injection. The animals are sacrificed 24 hours after the carrageenin injection. The inflammatory reaction to the carrageenin initiates the formation of exudate and gelatinous material which is removed and weighed. Control animals receive the carrageenin injection and the starch-sodium phosphate buffer solution orally without the test compound. Critical ratios, i.e., the weight of exudate and gelatinous material from control animals to the weight of some from test animals $(C/T)$ are calculated. The ratios are then compared by a 3-stage sequential screening proceedure representing a statistically designed method for detecting anti-inflammatory activity which is significantly different than the variability of control animals at the 95% confidence level.

| Stage | $(C/T$ ratio) reject | $(C/T$ ratio) accept |
|---|---|---|
| (1) $(C/T)_1$ | 1.11 or below | 1.65 or above. |
| (2) $(C/T)_1 \times (C/T)_2$ | 1.49 or below | 2.23 or above. |
| (3) $(C/T)_1 \times (C/T)_2 \times (C/T)_3$ | Below 2.46 | 2.46 or above. |

Thus, a compound which on the first stage gives a $(C/T)_1 = 1.11$ or below is rejected; if the ratio is between 1.11 and 1.65 the compound is retested; and if the ratio is 1.65 or above, the compound is accepted as active. On the second stage (retest because $(C/T)_1$ is between 1.11 and 1.65) if the product $(C/T)_1 \times (C/T)_2$ is 1.49 or below the compound is rejected; if the product is between 1.49 and 2.23, the compound is retracted; and if the product is 2.23 or above, the compound is accepted as active. On the third stage if the product $$(C/T)_1 \times (C/T)_2 \times (C/T)_3$$

is less than 2.46 the compound is rejected as inactive; but if this product is 2.46 or above the compound is accepted as an active anti-inflammatory agent.

A useful assay for detecting anti-pyretic activity consists of administering to 60 gm. rats 0.6 ml. of a 40% brewer's yeast solution by subcutaneous injection. Such treatment produces a rise in the body temperature of approximately 1.3 to 1.5° C. Seventeen hours after injection of the brewer's yeast solution the test compound is administered orally. Two hours later the rectal temperature of the test animals is measured using an electronic thermometer. The temperature suppression-effect of the test compound is expressed as the difference in temperature between the control and treated groups.

The compounds of this invention also have been found to be active analgesics in antagonizing the phenyl-p-quinone (PPQ) "writhing syndrome." The compounds are tested by a modification of the method described by E. Siegmund et al., Proc. Soc. Exptl. Biol. Med., 95, 729 (1957). Briefly the test is described as follows: Two mice are administered the test compound, orally, 30 minutes prior to the intraperitoneal injection of 1 mg./kg. phenyl-p-quinone (PPQ). Fifteen minutes later the mice are observed for a period of 3 minutes and the total number of characteristic writhing episodes for both animals is counted and recorded. The mean number of writhes exhibited by 21 pairs of control animals (dosed orally with 2% starch) was 29. For our purposes any compound that reduces the incidence of writhing to 18 or less, the compound is considered active in the (PPQ) test, otherwise the compound is rejected. The compounds may be administered in from 10 mg. to 1000 mg. per kilogram per day.

Detailed description

The following examples are for the purpose of illustration and are not to be construed as limiting this invention since many variations are possible without departing from the spirit or scope thereof.

EXAMPLE 1

Preparation of ethyl 5,8-dihydroxy-1,3-dimethylisoquinoline-4-carboxylate

A solution of 807 mg. of 2-acetyl-1,4-benzoquinone and 750 mg. of ethyl 3-aminocrotonate in 10 ml. of chloroform is heated at reflux temperature for 2 hours. A precipitate begins forming after 20 minutes. The solvent is removed from the mixture, and the residue is recrystallized from acetone-hexane to give 1.071 g. of crystals which slowly decomposed above 267° C. One additional recrystallization from acetone-hexane and then one from ethyl acetate with the acid of activated carbon gives 658 mg. of pale yellow crystals, which are soluble in dilute hydrochloric acid solution. This compound shows analgesic activity when tested as described above.

EXAMPLE 2

Preparation of t-butyl 5,8-dihydroxy-1,3-dimethylisoquinoline-4-carboxylate

A solution of 1.50 g. of 2-acetyl-1,4-benzoquinone and 1.57 g. of t-butyl 3-aminocrotonate in 25 ml. of chloroform is heated at reflux temperature for 2 hours to give 1.93 g. of crystals that slowly decomposed above 212° C. This product is freely soluble in dilute hydrochloric acid solution and is recrystallized from ethyl acetate to give cream-colored crystals.

EXAMPLE 3

Preparation of ethyl 5,8-diacetoxy-1,3-dimethylisoquinoline-4-carboxylate

A mixture of 1.00 g. of ethyl 5,8-dihydroxy-1,3-dimethyl-isoquinoline-4-carboxylate and 1.00 g. of sodium acetate in 25 ml. of acetic anhydride is heated at reflux temperature for 3 hours. The mixture is poured onto cracked ice and stirred until the excess acetic anyhdride is hydrolyzed. The solid is collected by filtration, air-dried, and purified by recrystallization from ether-petroleum ether (B.P. 30–60° C.) to give white crystals, melting point 118–119° C. This compound shows anti-pyretic activity giving a C-T value of 1.4, 1.5, and 1.5 (3 groups of test animals). It also has anti-inflammatory and analgesic activity.

EXAMPLE 4

Preparation of t-butyl 5,8-diacetoxy-1,3-dimethyl-isoquinoline-4-carboxylate

In the manner described in Example 3, treatment of t-butyl 5,8-dihydroxy-1,3-dimethylisoquinoline-4-carboxylate with sodium acetate and acetic anhydride gives crystals, melting point 137–138° C., after recrystallization from ether-petroleum ether (B.P. 30–60° C.).

EXAMPLE 5

Preparation of methyl 5,8-dimethoxy-1,3-dimethylisoquinoline-4-carboxylate

A stirred solution of 3.05 g. of ethyl 5,8-dihydroxy-1,3-dimethylisoquinoline-4-carboxylate in 20 ml. of ethanol and 35 ml. of 2 N sodium hydroxide solution is heated to reflux temperature and treated by dropwise addition with 6.00 g. of methyl sulfate. Heating is continued for 1 hour, after which an additional 6.00 g. of methyl sulfate is added. The solution is then heated an additional 1 hour, whereafter it is cooled. The resultant mixture is filtered to give 0.84 g. of crystals which on recrystallization from dilute alcohol furnishes 0.66 g. of crystals, melting point 79–81° C.

EXAMPLE 6

Preparation of ethyl trans-3-amino-2-(2-carbomethoxy-3,6-dihydroxyphenyl)crotonate A solution of 830 mg. of 2-carbomethoxy-1,4-benzoquinone and 645 mg. of ethyl 3-aminocrotonate in 10 ml. of ethonol is heated at reflux temperature for 2 hours. The solvent is removed and trituration of the residue with ether gives 871 mg. of crystals, melting point 132.5–134.5° C.

EXAMPLE 7

Preparation of ethyl 5,8-dihydroxy-3-methylisocarbostyril-4-carboxylate

A solution of 590 mg. of ethyl trans-3-amino-2-(2-carbomethoxy-3,6-dihydroxyphenyl)crotonate in 10 ml. of glacial acetic acid is heated on the steam bath 15 minutes and then allowed to stand at room temperature for 24 hours. The solution is distributed between ethyl acetate and water, and the aqueous phase is extracted further with ethyl acetate. The combined extracts are washed with water, dried and evaporated. The residue is recrystallized from acetone-hexane to give 132 mg. of crystals, melting point 249–251° C. dec. An additional recrystallization gives material with melting point 255–257° C. dec.

EXAMPLE 8

Preparation of 8-acetoxy-5-hydroxy-1,3-dimethylisoquinoline-4-carboxylic acid lactone A mixture of 100 mg. of t-butyl 5-8-diacetoxy-1,3-dimethylisoquinoline-4-carboxylate and 20 mg. of powdered porous plate is heated at 170–175° C. for 90 minutes. The cooled melt is treated with acetone and filtered. The filtrate is evaporated and the residue is recrystallized from methylene chloride-hexane to give yellow crystals, melting point 189–191° C.

EXAMPLE 9

Preparation of ethyl 1,3-dimethyl-5,8-dioxo-5H,8H-isoquinoline-4-carboxylate

A solution of 1.00 g. of ethyl 5,8-dihydroxyl-1,3-dimethylisoquinoline-4-carboxylate and 2.00 g. of ferric chloride in 100 ml. of methanol is allowed to stand at room temperature for 4 hours. The solution is diluted with water and extracted with ethyl acetate, and the dried extracts are evaporated. The residue is recrystallized from ether-petroleum ether to give 593 mg. of yellow crystals, melting point 103.0–103.5° C.

What is claimed is:

1. A compound of the formula:

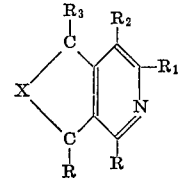

wherein R is selected from the group consisting of hydroxy and lower alkyl, $R_1$ is lower alkyl; $R_2$ is carbolower alkoxy; $R_3$ selected from the group consisting of hydroxy, ketonic oxygen, lower alkoxy and lower alkanoyloxy; $R_4$ is selected from the group consisting of hydroxy, ketonic oxygen, lower alkoxy and lower alkanoyloxy; X is selected from the group consisting of

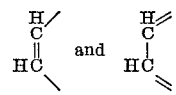

$R_2$ and $R_3$ taken together is

and when $R_3$ and $R_4$ are ketonic oxygen, then X is

and non-toxic pharmaceutically acceptable acid addition salts thereof.

2. A compound according to claim 1: 1,3-dilower alkyl-5,8-dihydroxyisoquinoline-4-carboxylic acid lower alkyl esters.

3. A compound according to claim 1: 1,3-dilower alkyl - 5,8 - dioxo - 5H,8H - isoquinoline-4-carboxylic acid lower alkyl esters.

4. The compound according to claim 1: ethyl 5,8-dihydroxy-1,3-dimethylisoquinoline-4-carboxylate.

5. The compound according to claim 1: t-butyl-5,8-dihydroxy-1,3-dimethylisoquinoline-4-carboxylate.

6. The compound according to claim 1: ethyl 5,8-diacetoxy-1,3-dimethylisoquinoline-4-carboxylate.

7. The compound according to claim 1: t-butyl 5,8-diacetoxy-1,3-dimethylisoquoinoline-4-carboxylate.

8. The compound according to claim 1: ethyl 5,8-dihydroxy-3-methylisocarbostyril-4-carboxylate.

9. The compound according to claim 1: 8-acetoxy-5-hydroxy-1,3-dimethylisoquinoline-4-carboxylic acid lactone.

10. The compound according to claim 1: ethyl-1,3-dimethyl-5,8-dioxo-5H,8H-isoquinoline-4-carboxylate.

References Cited

UNITED STATES PATENTS 2,913,453  11/1959  Petersen et al. _____ 260—287 X

DONALD G. DAUS, Primary Examiner

U.S. Cl. X.R.

260—286, 396, 471; 424—258